Jan. 19, 1965   J. S. KURTZ ETAL   3,166,175
EGG COLLECTION AND TRANSVEYOR SYSTEM
Filed July 9, 1962   4 Sheets-Sheet 1

INVENTORS
JOHN S. KURTZ
JEWEL GRAVES
BY
ATTORNEYS

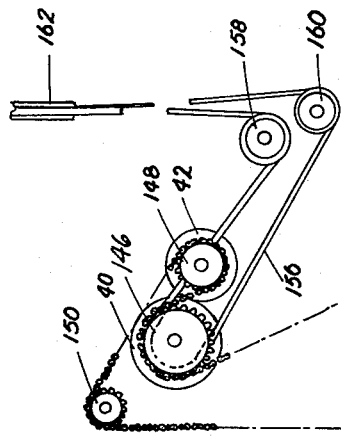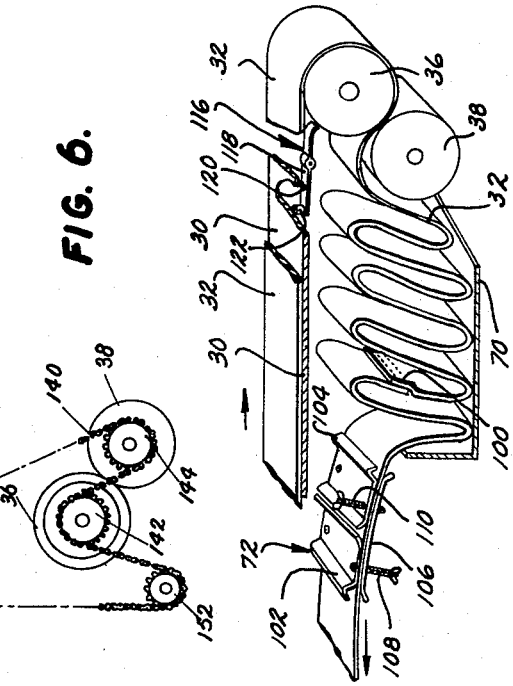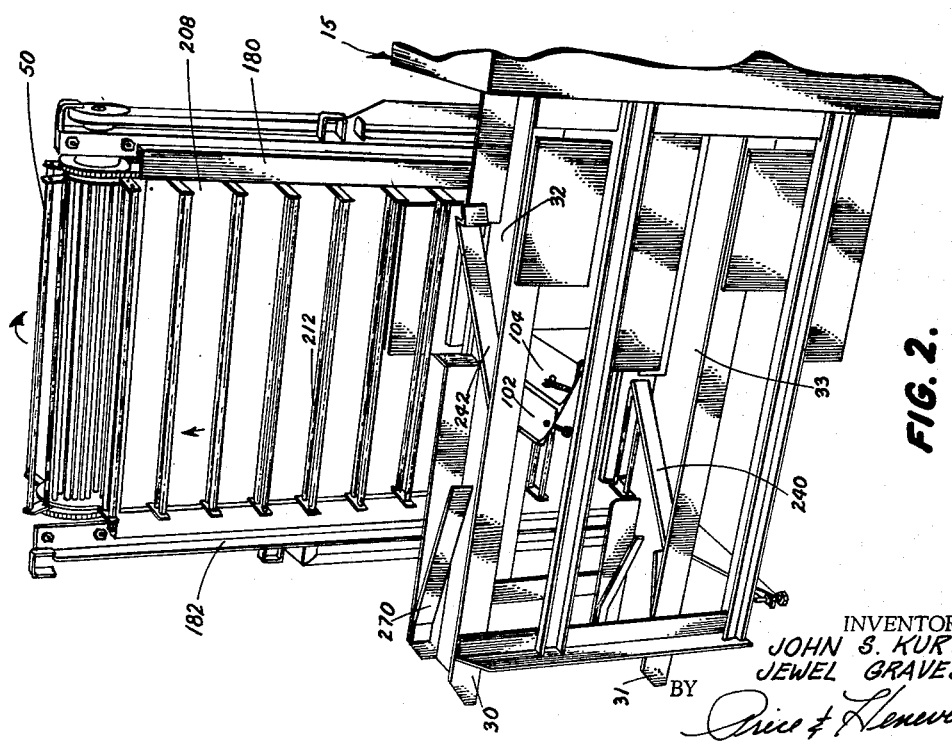

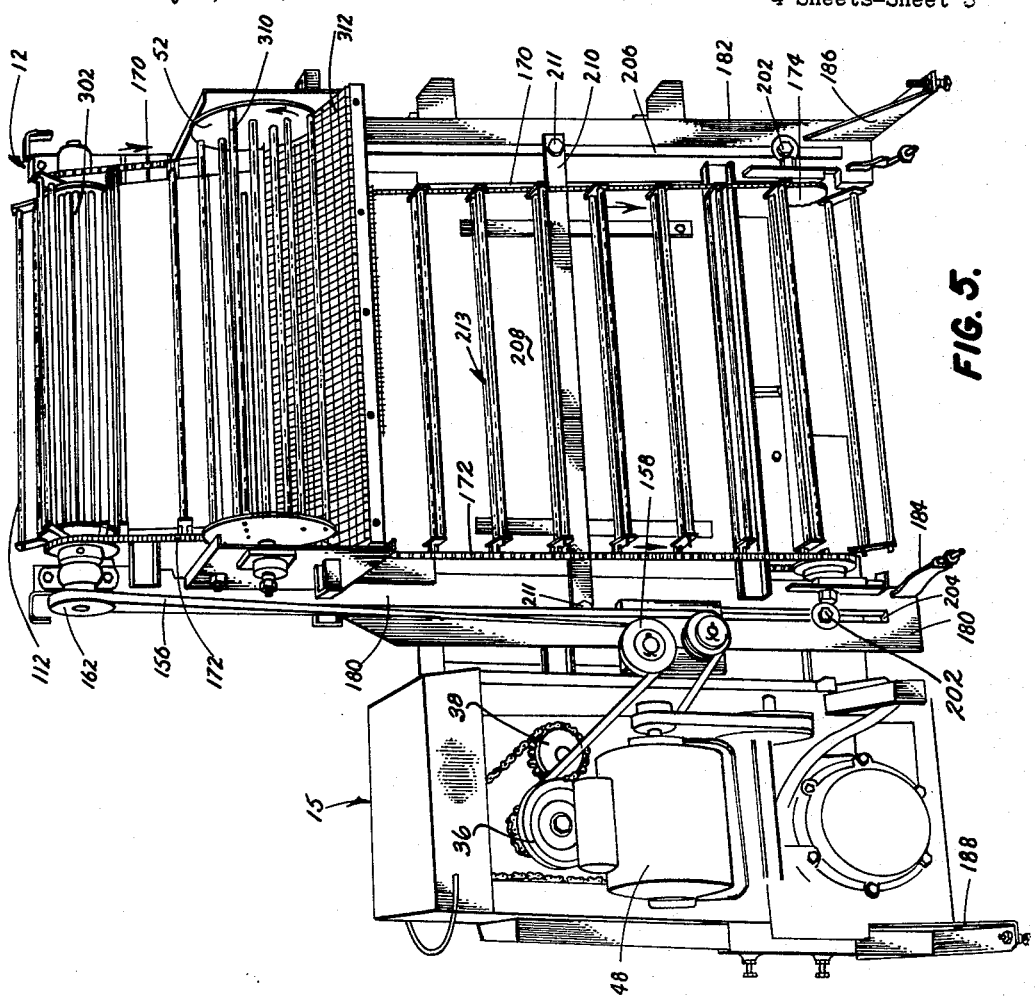

Jan. 19, 1965 J. S. KURTZ ETAL 3,166,175
EGG COLLECTION AND TRANSVEYOR SYSTEM
Filed July 9, 1962 4 Sheets-Sheet 4
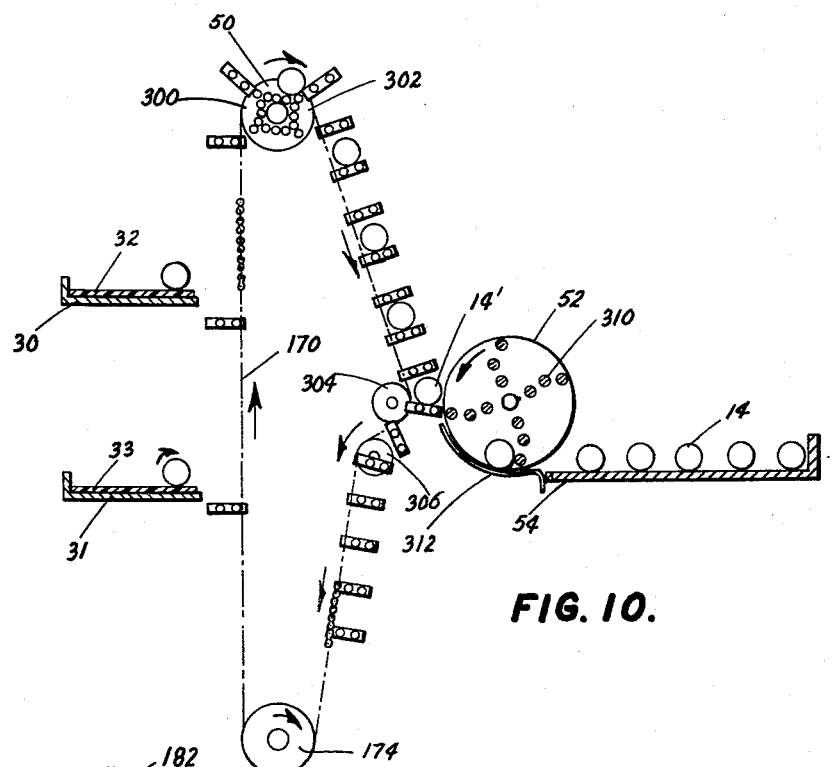
FIG. 10.
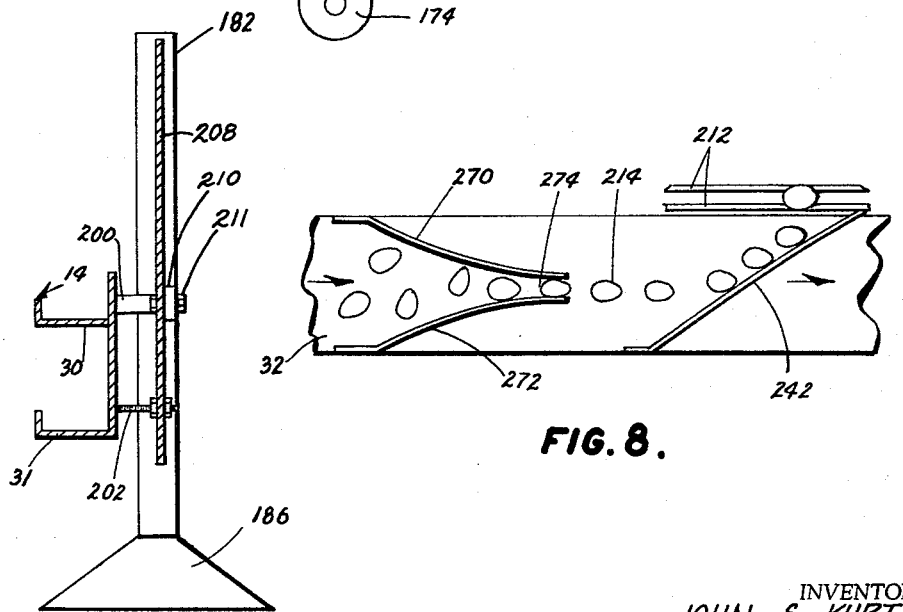
FIG. 8.
FIG. 11.
INVENTORS
JOHN S. KURTZ
JEWEL GRAVES
BY
ATTORNEYS

United States Patent Office 3,166,175
Patented Jan. 19, 1965

3,166,175
EGG COLLECTION AND TRANSVEYOR SYSTEM
John S. Kurtz, Ephrata, Pa., and Jewel Graves, Holland, Mich., assignors to Automatic Poultry Feeder Company, Zeeland, Mich., a corporation of Michigan
Filed July 9, 1962, Ser. No. 208,302
12 Claims. (Cl. 198—25)

This invention relates to fowl husbandry, and more particularly to egg handling apparatus including egg elevator means and cooperating conveyor means.

Poultry husbandry today involves a great deal of automation both in feeding and egg gathering. Optimum automation for egg gathering requires conveyor means adapted to transport eggs directly from the nests to a central gathering point. This can often involve transporting eggs from several different nest housings including hundreds of individual nests. Conventional apparatus includes a separate transfer system for each floor of each poultry house. An optimum conveyor system would enable transporting of eggs not only from different nest housings on one floor of one poultry house, but also from more than one floor and more than one poultry house, to a common gathering point which may comprise a separate washing, counting and packaging center or housing. However, conveyors utilized heretofore have not been capable of ready adjustment to accommodate nest housings on different levels. More specifically, the conveyor structure as well as the collection center has been limited to one particular level so that the nest housings have had to be blocked proper amounts to suit the conveyor. Further, a satisfactory method for transferring eggs from multiple story poultry houses to a common collection center in an economical, simple and adjustable manner is not presently available. Therefore, automatic egg collection and transfer mechanism has been relatively limited.

Further, since the egg transfer conveyor belt mechanism is preferably formed of a substance such as jute which provides excellent egg transfer characteristics, the belts are highly responsive to changing moisture conditions to stretch or contract large amounts. These belts can cause a great deal of egg breakage when they slacken and get wound around the power roller. Further, if a conventional tensioner element is used to hold the belt taut regardless of slack, the overlapping joined ends of the belt forming a thick juncture portion tend to cause the belt to jerk and snap through the tensioner, thereby upsetting the eggs and causing breakage.

It is an object of this invention to provide an egg handling apparatus having a unique elevator means adapted to receive eggs from any particular level and transfer the eggs to the desired level in a gentle, reliable manner.

It is another object of this invention to provide an egg elevator and cooperating conveyor apparatus which are vertically adjustable with respect to each other so that the conveyor can be adjusted to suit any particular poultry house or nest housing height and yet can still cooperate with the elevator in an optimum controlled manner to transfer the eggs gently and positively to a common collection center.

It is another object of this invention to provide an egg handling apparatus including a single elevator means capable of cooperating in an adjustable manner with any number of conveyor levels to serve one or more stories of a poultry house, and to accommodate any number of vertically spaced individual nests.

It is another object of this invention to provide an adjustable elevator apparatus having an adjustable egg transfer control means allowing transfer of eggs from the conveyor levels to the elevator under optimum conditions.

It is another object of this invention to provide an egg elevator apparatus not only having controlled transfer conditions from the conveyor to the elevator, but also controlled transfer of eggs from the elevator to the receiving surface of the collection center.

It is another object of this invention to provide an egg conveyor belt safety mechanism preventing winding up of the belt on a power roller to thereby upset the eggs.

It is another object of this invention to provide an egg conveyor belt control mechanism including a tensioning means which controls the proper tension of the belt, and also prevents thickened portions of the belt from jerking the belt to damage the eggs as these portions pass through the tensioner means.

It is still another object of this invention to provide a unique alignment means for eggs on the conveyor to enable them to be properly transferred to the elevator means in a specific oriented condition to forestall breakage of the eggs.

These and many other objects of this invention will be apparent upon studying the following specification in conjunction with the drawings in which:

FIG. 2 is an enlarged perspective view of the elevator apparatus and adjacent conveyor means;

FIG. 5 is an enlarged perspective view of the novel elevator apparatus vewed from the opposite side of that side illustrated in FIGS. 1 and 2 and showing apparatus for transferring from the elevator;

FIG. 6 is an elevational partially schematic view of the main driving mechanism for the conveyor and elevator;

FIG. 7 is a fragmentary perspective view of the power roller means of the egg conveyor mechanism and the belt control and safety apparatus therefor;

FIG. 8 is a top plan view of a portion of one of the conveyor levels adjacent the elevator, and showing the novel alignment means for eggs to be transferred unto the elevator;

FIG. 9 is a fragmentary perspective view of the idler roller device of the conveyor means;

FIG. 10 is a side elevational, sectional, partially schematic view of the elevator apparatus and its association with the conveyor means and egg receiving surface;

FIG. 11 is a sectional view of the conveyor mechanism and elevator support stand showing the adjustable relationship therebetween; and FIG. 12 is a fragmentary end elevational view of one of the idler rollers of FIG. 9.

Figure 1:
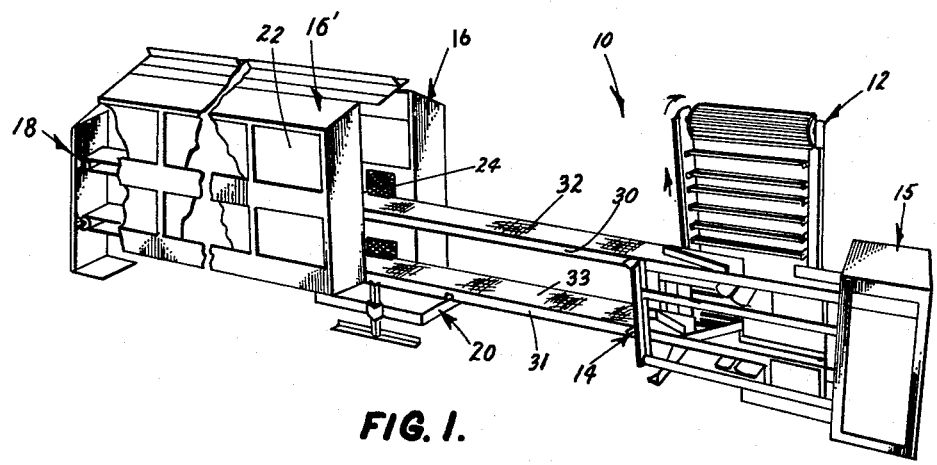
FIG. 1 is a perspective view of a typical nest housing having the conveyor means and elevator means of this invention.

Basically, the novel egg handling apparatus comprises a unique egg conveyor means and inter-related egg elevator and transfer device. The egg elevator has a plurality of egg carrying flights mounted to move in an endless manner up one side, crossing over at the top, and down the other side. The conveyor means is adjustably mounted with respect to the elevator to feed eggs in a controlled manner onto the up-moving side of the elevator. The elevator includes a unique egg transfer control means allowing egg transfer from the conveyor means to the flights, preferably pairs of bars forming elongated pockets, only when the flights are substantially aligned with the particular conveyor level concerned. The eggs are also gently crossed over at the top of the elevator from their support position on one side of a flight to a position on the opposite side of an adjacent flight to pass down the other side. An egg removal or transfer apparatus from the elevator moves eggs generally on an asymtotic curve onto a horizontal support surface in a gentle but positive manner. The egg transfer control means and the conveyor means are adjustable on the remainder of the elevator means to accommodate conveyors of different height. Orienting fingers on the conveyor assure proper alignment of eggs transferred onto the flights to eliminate egg breakage.

The egg conveyor belt includes a belt tension control composed of at least two tensioning members whereby the tensioning members alternate in control of the belt to prevent it from jerking when one of the tensioning members is disrupted with passage of thickened joined portions of the belt. The belt further is prevented from tangling around the power rollers to cause egg breakage, by a safety switch pivoting member adapted to shut down the equipment.

Other features of the invention will be readily apparent from the detailed description. Referring to the drawings, the novel egg handling and transfer apparatus 10 includes egg elevator 12 and conveyor means 14 shown as including upper and lower levels. The conveyor is shown associated with a pair of back-to-back nest housings 16 and 16' between which the conveyor means is mounted for cooperation with both. Idler mechanism 18 at the far end reverses the direction of the two belts shown, or any number of belts as desired.

The nest housings 16 and 16', as well as the conveyor mechanism between the houses may be supported on an adjustable stand means 20 such as that disclosed more specifically in copending application Serial No. 208,297, filed July 9, 1962, entitled Nest Support, now U.S. Patent No. 3,124,102. The individual nests 22 each include an egg roll-out opening 24 in the back cooperative with the conveyor mechanism to transfer laid eggs unto the particular conveyor level concerned. The conveyor can include a plurality of levels, here shown for convenience to be two. Each level may include a metallic support 30 with a belt 32 traveling thereover. Each belt is preferably formed of a material such as jute and is driven by a pair of adjacent power rollers, e.g. 36 and 38 (FIG. 7) for upper belt 32, and power rollers 40 and 42 (FIG. 6) for lower belt 33 on lower support 31. The power rollers may be driven by suitable motor means, such as electrical motor 48 (FIG. 5), here shown as part of power drive mechanism 15 in a suitable housing.

In order to understand the detailed description of the apparatus more clearly, it should be realized that each of the two levels of the conveyor shown operates independently of each other in transferring eggs from one level of the nest housings, to the elevator apparatus 12 where the eggs are transferred from the individual conveyor levels to the single elevator. The eggs are carried up one side of the elevator (as illustrated in FIGS. 1 and 2), crossed over at the top by cross-over member 50, lowered down the opposite side of the elevator on the back side of individual flights of the elevator, and then transferred by rotating spider unloader member 52 (FIGS. 5 and 10) unto horizontal egg receiving surface 54. Surface 54 may comprise a table, a conveyor belt or any other suitable receiving surface as the situation requires. This entire operation is illustrated schematically in FIG. 10.

Each of the belts is drawn across their elongated support surface by their respective pair of power rollers, passes into a slack bin 70 (FIG. 7), passes through the novel tensioning means 72, and then returns to the other end of the nest housings 16 and 16', to go around idler rollers of idler mechanism 18.

Upper idler roller 76, accommodating upper belt 32, is mounted in a pair of bearings 78 and 80, while lower idler roller 82, accommodating lower belt 33, is mounted between a similar pair of bearings 84 and 86. Each of the bearings includes a pair of studs 88 and 90 which extend through vertical slots 92 and 94 of the idler support 18 to provide vertical adjustment of the rollers. Also, each of the roller studs includes a pair of lock nuts 96 and 98 (FIG. 12) to enable the ends of each roller to be adjusted toward or away from the support stand. Thus, the idler rollers have practically universal adjustment due to these features.

The tensioning means 72 of the belt must be capable of controlling the tension of the belt while also preventing the belt from jerking or jumping when thickened portion 100 forming the sewn junction of the ends of the now endless belt passes through. In other words, as thickened portion 100 contacts the plate, it stops briefly. After considerable stretching of the belt and considerable force is exerted on the belt, portion 100 rapidly passes between the plates, causing them to open up wide against the bias of their compressing springs. The belt has a tendency to snap through with a jerk. With prior art tensioners, this tends to throw the eggs about on the conveyor and cause breakage. Applicant's novel tensioning apparatus 72 overcomes this. It includes at least two upper members 102 and 104 biased against common lower plate 106 by compression springs 108 and 110. If desired, instead of one lower plate 106, two plates may be substituted. The device assures positive control in a non-jerking fashion of the belt, since when thickened portion 100 lifts and passes underneath first plate 104 to disrupt its regular action, the second plate 102 maintains control over the belt to prevent it from jerking the egg carrying part of the belt. While the thickened portion passes beneath the second plate, the first plate maintains control over the belt. Thus, jerking of the belt is eliminated.

The belt mechanism of the egg transfer apparatus includes still another safety feature to forestall egg breakage. The slack belt passing through power rollers 36 and 38 are prevented from winding up on roller 36 to thus jam the apparatus and throw eggs about. This is done with novel safety release means 116 which includes a pivotal lever or plate 118 having its foremost surface adjacent the periphery of roller 36, and being spring biased toward the emerging belt 32 from between the power rollers. This bias is achieved preferably by a tension spring 120 between belt support 30 and the lever 118 on the opposite side of its pivotal mounting axis. A micro-switch 122 is normally pressed against the under surface of belt support 30 or against any other surface by this biased action, to hold the switch normally closed. The switch controls power to the conveyor driving motor 48. If belt 32 emerging from the rollers 36 and 38 starts to wind around the roller 36, it bunches against the foremost surface of the lever 118 causing pressure on it to pivot it against its spring bias 120. This moves micro-switch 122 away from surface 30 to open the switch and shut-off electrical power to motor 48, which thereby shuts down the entire mechanism to prevent further damage until the situation is rectified. The foremost edge of bin 70 is positioned adjacent lower roller 38 to prevent any slack from winding around it.

Motor 48 drives the conveyor belts by driving rollers 36, 38, 40 and 42 through chains 140, sprockets 142, 144, 146, 148 and idler sprockets 150 and 152. It also drives the elevator apparatus through belt 156 driven by sprocket 146 and passing around idler sheaves 158 and 160 to sheave 162 operably mounted to the cross-over member 50 of the elevator.

The elevator mechanism includes a pair of endless chains 170 and 172 which pass around sprockets on the axle of the top cross-over member 50, and around sprockets 174 at the bottom of the elevator. The elevator 12 is supported by a pair of end positioned, spaced, uprights 180 and 182 having feet 184 and 186. Power means 15 is preferably integrally attached to these vertical supports and includes a third foot 188.

The conveyor mechanism 14 is vertically adjustably mounted to this pair of uprights 180 and 182 through a pair of collars 200 (FIG. 11) and a pair of lower studs 202. The upper collars include studs which also support the interconnected bar 210 and panel 208 as described hereinafter to obtain simultaneous vertical adjustment of the conveyors and the panel. Both the studs 211 and studs 202 project through vertical slots 204 and 206 (FIG. 5) so that the conveyor means and panel 208 may be adjusted up or down with respect to the elevator means.

Figures 3, 4:
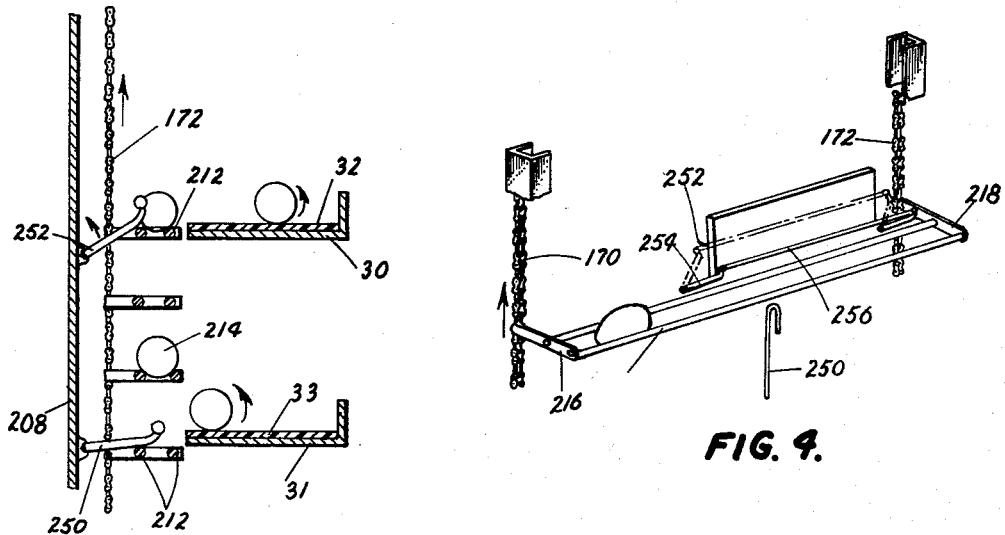
FIG. 3 is a fragmentary, sectional, side elevational view of the egg transfer and control devices between the conveyor levels and the elevator apparatus.
FIG. 4 is a fragmentary, perspective view of one level of the apparatus illustrated in FIG. 3.

When desired, studs 211 may be loosened so that the entire central panel 208 may be slid upwardly or downwardly between supports 180 and 182. This panel 208 is adjustable in order to control the transfer of eggs from the conveyor belts 32 and 33 unto the individual flights 213 of the elevator, each composed of a pair of spaced, parallel bars 212 which define an elongated pocket for retaining eggs 214 as illustrated in FIGS. 3 and 4. These bars are supported by end plates 216 and 218, which are affixed to conveyor chains 170 and 172. Each of the flights 213 passes successively past the two conveyor levels to receive eggs therefrom. The eggs are deflected from the conveyors by respective diagonal reflecting members 240 and 242 under which the belts travel. The lower deflecting member 240 is adapted to roll eggs unto the first half of the flights, while the upper diagonal deflecting member 242 is positioned to roll eggs unto the second half of the conveyor flights. If three or more conveyor levels are used, the elongated pockets defined by bars 212 will be divided into three or more sections rather than two as illustrated. This division of the flight prevents eggs from an upper level from rolling onto another egg from a lower level causing breakage. If desired, a central dividing member 250 (FIG. 4) may also be utilized to prevent any eggs from rolling from the first half of the conveyor to the second half.

Since the conveyor mechanism may be adjusted with respect to the vertical uprights of the elevator, a control means is provided to prevent eggs from rolling off the conveyor unto the elevator flights when the flights are several inches below the level of the conveyor. In other words, as the individual flights of the elevator rise and approach the level of each conveyor, the eggs must be allowed to roll off the conveyor only when the flight is practically aligned with it. Therefore, a pivotal control means 250 is provided for the lower conveyor, and means 252 is provided for the upper conveyor. Each of these control means essentially comprises a U-shaped element formed of a pair of short end legs 254 and a long crossbar 256. Each of the end legs is pivotally mounted to panel 208 of the elevator. Also, preferably a torsion spring (not clearly visible) is provided at these pivotal mounting places to bias the control or timer member to a downward almost horizontal position. When the pivotal members are in the downward position (as illustrated by number 250 in FIG. 3), the eggs are held back by the crossbar and prevented from rolling off the conveyor. The control members are positioned substantially opposite and preferably slightly below the conveyor levels to achieve this. As the flights continue to rise, the rear bar of bars 212 contact the pivotal member, (such as is illustrated in member 252 in FIG. 3) to slowly pivot the member upwardly against its bias and toward panel 208 to thereby enable an egg to roll from the conveyor to a position nestled in the pocket between the bars 212. This occurs only when the bars are substantially aligned with the conveyor to thereby receive optimum transfer conditions.

In order to assure that the eggs are in an axially aligned condition in an optimum manner on bars 212, a pair of cooperating orienting fingers 270 and 272 are provided on each conveyor to form a gate. These gates may be formed of light resilient spring metal fingers or the like which converge toward each other to form a narrow outlet gate 274 having a width substantially that of the width of eggs 214. As eggs 214 are conveyed along on the belts, they are specifically oriented as illustrated in FIG. 8, with their long dimension generally uni-directional with rods 212. Thus, as the eggs contact the diagonal deflecting member 242, they are rolled laterally in a uniform manner to assure proper positioning on the bars 212. This is especially important also with crossover member 50. The fingers are resilient to move out for a thick egg, but they are biased to their most convergent condition. It will be apparent that the spring metal may be substantially plastic, or even spring biased pivotal fingers which are not resilient. However, the resilient fingers are much preferred due to their flexible, gentle, dependable orienting action.

Cross-over member 50 includes a pair of circular end discs 300 between which are mounted a plurality of rods 302, preferably coated with a cushion material such as rubber. In fact, it is preferable to coat all the rods of this apparatus with a cushion material such as rubber, plastic or the like. These rods 302 are placed to generally form a star, shown to have four points in the form of the invention illustrated, with concave recesses between the points of the star. The discs and rods rotate as driven by belt 156 (FIG. 6) in synchronism with movement of conveyor chains 170 and 172 around their endless path. The flights of the elevator are caused to coincide with the points of the star (FIG. 10) as the flights pass around the cross-over. Eggs positioned on one side of the flights gently roll through the concave recesses between the points of the star as the endless chain and flights move over the topmost part of their endless path, and come to rest on the opposite side of the adjacent flight (FIG. 10). As the flights continue down, conveyor chains 170 and 172 move down and around special sprockets 304 and 306 which cause the flights to tilt and discharge eggs thereon.

In order to provide a positive, gentle discharge of the eggs from these flights to support surface 54, a special spider wheel 52 or discharge mechanism is utilized. This includes a pair of circular end discs adapted to rotate, and having mounted therebetween a plurality of bars 310. These bars are mounted in groups to form radially extending support means or wings having generally concave elongated pockets formed by a group of three bars. As the mechanism rotates counterclockwise as illustrated in FIG. 10, and each wing approaches the individual flights of the conveyor, the bars receive the egg, e.g. 14', and gently lower it along an asymtotic curve between the flight and the support surface 54. This curve includes a lower support surface 312 which may comprise a plastic coated wire mesh as illustrated in FIG. 5. The eggs are assured of a gentle discharge from the elevator due to the slowly revolving spider 52. Also, no eggs are allowed to hang up on the discharge, since they are gently brushed unto the surface 54 if they tend to stop in their movement. A collection or discharge surface may comprise a table 54 mounted to vertical uprights 180 and 182 of the elevator mechanism. It should be realized that this discharge surface may be a counting table, a washing mechanism, another conveyor belt, or any other suitable surface.

*Operation*

Eggs laid by chickens or other fowl in nest housings 16 and 16' roll out the respective rear openings 24 of the individual nests 22 and unto either conveyor belt 32 or conveyor belt 33 depending upon the particular nest involved. The eggs are conveyed along on the belt and pass through the aligning fingers 270 and 272 (FIG. 8) and out the gate to become aligned properly. The diagonal surface 242 causes the eggs to roll laterally for loading onto the elevator flights 213. The eggs are prevented from rolling onto the flights when the flight bars are substantially below the height of the conveyors, by timer or control elements 250 and 252. As each individual flight of the conveyor moves upwardly and pivots the respective control element out of the way, as illustrated in phantom in FIG. 4, the individual eggs are allowed to roll unto the conveyor bars. They are carried upwardly and shifted from one side of the individual flights to the opposite side of the adjacent flight by star wheel or cross-over 50, at the top of the conveyor. The eggs are then carried downwardly where they are tilted off the individual flights and are removed in a smooth fashion by rotating spider wheel 52, which guides them unto surface 54. Driving action of the conveyor as well as the elevator is achieved through the chain and belt elements illustrated in FIG. 6. Control is obtained over the two respective conveyor belts 31 and 32 by tension control means 72 and safety shut-off means 116. The eggs are thus assured of a gentle, non-jerking passage from the nest to the gathering surface 54.

If the apparatus is to be utilized with a second floor poultry house, the elevator is merely made of sufficient height to accommodate the height and the number of conveyor levels associated therewith.

If relative adjustment between the conveyors and elevator is necessary, studs 202 and 200 (FIGS. 11 and 5) mounting the conveyor means 14 on the vertical uprights 180 and 182 are loosened and the conveyor levels are adjusted to the proper height. The gathering surface remains stationary as do the upright supports. The central panel 208 is then adjusted by loosening studs 211 on bar 210 so that the timer or control levers 250 and 252 are moved to the proper position with respect to conveyor belts.

The idler rollers 76 and 82 may likewise be adjusted to accommodate the particular conveyor height by loosening the respective lock nuts illustrated in FIG. 12 and vertically and otherwise adjusting the rollers.

It will thus be realized that the egg handling apparatus is completely flexible to accommodate to transfer eggs from one poultry house, or a number of poultry houses to a central location. It may further accommodate multistory houses, any number of nest housings, and in a convenient, safe, gentle, economical manner.

The term elevator is intended to include downward action as well as elevating or upward action. The action of the elevator could conceivably be all downward instead of up and then down, as in the preferred form of the invention. For example, if the elevator flights moved past the vertically adjustable conveyor in a downward direction, received eggs in a controlled fashion, and then discharged the eggs to a surface beneath the conveyors, preferably using a spider wheel, this would still come within the broadest aspects of this invention.

Various other advantages, not heretofore enumerated, but obvious from the illustrated form of the invention and the principles taught will occur to those in the art. Also, various other obvious modifications of the apparatus may occur to those in the art to suit a particular situation. These obvious modifications are deemed to be part of this invention if within the principles taught, since this invention is intended to be limited only by the scope of the appended claims, and the reasonably equivalent structures to those defined therein.

We claim:

1. An egg handling apparatus comprising: an egg elevator having a plurality of egg carrying flights mounted to move in an endless manner; egg conveyor means adjacent said elevator egg diverter means cooperative with said conveyor means to laterally divert eggs from said conveyor unto flights of said elevator as the flights move past said conveyor means; and egg transfer control element means normally projecting into the transfer path of eggs to prevent transfer from said conveyor means to said elevator, and being repeatedly shifted out of said transfer path by passing of individual elevator flights as each flight approaches alignment with said conveyor means, to thereby obtain optimum egg transfer without breakage.

2. The apparatus in claim 1 wherein said control element means is pivotally mounted to said elevator, is pivotally shifted out of said transfer path by engagement with the flights passing, and is biased to return to the projecting position after release from the flights pass.

3. An egg handling apparatus comprising: an egg elevator having a plurality of egg carrying flights mounted to move in an endless manner; egg conveyor means adjacent said elevator; egg diverter means above said conveyor means to transfer eggs laterally from said conveyor unto flights of said elevator as the flights move past said conveyor means; said conveyor means being vertically adjustable with respect to said elevator means; egg transfer control means normally biased to a position projecting into the transfer path of eggs to prevent transfer from said conveyor means unto said elevator, and into the path of passing conveyor flights; said control means being repeatedly shifted out of said transfer path by engagement with passing elevator flights as each flight approaches alignment with said conveyor means to obtain optimum egg transfer without breakage and being released to return to its original position with passage of said flights; and said control means being vertically adjustable with respect to said elevator to achieve optimum transfer conditions under all conditions.

4. An egg handling apparatus comprising: an egg elevator having a plurality of egg reciving pockets mounted to move in an endless manner; egg conveyor means adjacent said elevator and cooperative with said conveyor means to transfer eggs laterally from said conveyor means into pockets of said elevator as the pockets move past said conveyor means; said elevator including a support portion and a vertically adjustable mounting portion movable with respect to said support portion; control element means attached to said vertically adjustable portion; said control means being normally in a position in the transfer path of eggs from said conveyor to said pockets, to prevent reception of eggs in said pockets and being in the path of said pockets to be repeatedly shiftable out of said position by engagement with passing pockets as each pocket approaches alignment with said conveyor means; and said conveyor means also being vertically adjustable simultaneously with said mounting portion to move vertically the same amount as said control means, whereby optimum egg transfer is obtained no matter what the vertical positioning is between the elevator and the conveyor means.

5. An egg handling apparatus comprising: an elevator having endlessly moving spaced flights moving up one side of said elevator adapted to cooperate with means transferring eggs unto said flights, and moving down the opposite side adapted to cooperate with means transferring eggs off of said flights; each of said flights being configurated to hold eggs on either side thereof; and rotatable egg cross-over means adjacent the top of said elevator; said cross-over means having a plurality of concave egg receiving portions around its periphery of a breadth equal to the spacing of said flights, each concave portion being between two passing flights to receive eggs from an up-moving flight as it starts to invert for the down movement, and gently roll the eggs to the opposite side of the adjacent flight as the inversion of the latter flight nears completion.

6. The apparatus in claim 5 wherein each of said flights constitutes a pair of spaced, generally parallel rod members and said cross-over means constitutes an elongated star wheel with said concave portions between the points of the star.

7. An egg handling apparatus comprising: an elevator type means including continuous, flexible supporting means mounting a plurality of spaced and movable flights to lower eggs from one level to a lower level and to discharge said eggs at said lower level; an egg receiving surface at said lower level; guide means adjacent said lower level engaging said flexible support means and cooperative with said flexible support means to divert said flights sufficiently to tilt them to discharge eggs therefrom; and egg transfer means between said flights and said surface adjacent said guide means comprising an arcuate lead-off support and a plurality of cooperative radially oriented wings movable along said lead-off support tracing generally an asymtotic curve between said flights when tilted and said surface whereby eggs discharged from said flights are positively and gently transferred to said surface.

8. The apparatus in claim 7 wherein a plurality of said wings form radial portions of a revolving generally cylindrical member above said arcuate lead-off support.

9. The apparatus in claim 7 wherein said flights each constitute a pair of spaced, generally parallel bars, and said wings constitute radial portions of a revolving generally cylindrical elongated member formed of a plurality of spaced bars.

10. An egg handling apparatus capable of receiving eggs from a conveyor at any selected level and of transferring the eggs to a surface at another level, comprising: an egg elevator having a plurality of egg carrying flights mounted to move in an endless manner between egg conveyor means at a selected level and a surface at another level; egg conveyor means at a selected level and adjacent said elevator, transfer means cooperative with said conveyor means to transfer eggs from said conveyor means unto flights of said elevator as the flights move past said conveyor means; said conveyor means being vertically adjustable with respect to said elevator means to allow its operation at a selected level; egg transfer control means between said conveyor means and said elevator means, and normally biased to a position projecting into the transfer path of eggs to prevent transfer from said conveyor means unto said elevator, and in the path of passing elevator flights; said control means being repeatedly shifted out of said transfer path by engagement with passing elevator flights as each flight approaches alignment with said conveyor means, to obtain optimum egg transfer without breakage; said control means being vertically adjustable along with said conveyor means to achieve optimum transfer conditions under all conditions; said flights when moving up one side of said elevator, being cooperative with said transfer means transferring eggs unto said flights; second transfer means to transfer eggs from said flights to an egg receiving surface; said flights, when moving down the opposite side, being cooperative with said means transferring eggs off of said flights; each of said flights being configurated to hold eggs on either side thereof; rotating egg cross-over means adjacent the top of said elevator receiving eggs from the up-moving flights as they start to invert for the down movement, and passing the eggs to the opposite side of the flights as the inversion of the flights nears completion; an egg receiving surface adjacent the side of said elevator opposite said conveyor means; and egg transfer means between said flights and said surface comprising a plurality of radially oriented wings causing eggs to move in a generally asymtotic curve between said flights and said surface whereby eggs discharged from said flights are positively and gently transferred to said surface.

11. Egg handling apparatus capable of transferring eggs from one level to another level comprising: egg conveyor means at one level; egg elevator means adjacent said egg conveyor means; egg receiving surface means on the opposite side of said elevator means from said egg conveyor means; a plurality of spaced conveyor flights on said elevator means moving up past said conveyor means and down past said surface means; said flights capable of receiving eggs from said conveyor means and elevating the eggs to the top of said elevator means; egg transfer control means positioned between said conveyor means and said elevator flights and comprising an oscillatory, depressible, elongated means in the path of said flights and in the transfer path of the eggs from said conveyor means to said flights, preventing movement of the eggs from said conveyor means to said flights until a passing flight depresses said elongated means and is positioned to receive the eggs; cross over means at the top of said elevator means for transferring elevated eggs to down-moving flights on said opposite elevator side; and unloading means adjacent said surface means, transferring said eggs from down-moving flights to said surface means.

12. The apparatus in claim 11 wherein said cross-over means comprises revolving means having egg-receiving pockets spaced apart the same distance as the spacing of said flights and cooperative temporarily between adjacent ones of said flights for rolling the eggs between flights.

References Cited in the file of this patent
UNITED STATES PATENTS

| | | |
|---|---|---|
| 1,365,565 | Thomas | Jan. 11, 1921 |
| 2,612,988 | Andrews | Oct. 7, 1952 |
| 2,620,059 | Niedered | Dec. 2, 1952 |
| 2,679,309 | Reading | May 25, 1954 |
| 2,710,682 | Coll | June 14, 1955 |
| 2,724,485 | Reading | Nov. 22, 1955 |
| 2,827,159 | Peteler | Mar. 18, 1958 |
| 2,895,274 | Mumma | July 21, 1959 |
| 2,952,350 | Hill | Sept. 13, 1960 |
| 2,986,267 | Carlson | May 30, 1961 |
| 3,005,540 | Hinderaken | Oct. 24, 1961 |
| 3,107,005 | Cauffman | Oct. 15, 1963 |
| 3,111,215 | Tellefson | Nov. 19, 1963 |